United States Patent Office 3,144,348
Patented Aug. 11, 1964

3,144,348
ADDUCT OF THIOGLYCOLIC ACID AND POLY-
ETHYLENE WAX, EMULSIONS THEREOF,
AND METHOD OF PREPARING SAME
Robert J. Turbett, Millington, N.J., assignor to Union
Carbide Corporation, a corporation of New York
No Drawing. Filed Jan. 23, 1961, Ser. No. 86,946
10 Claims. (Cl. 106—271)

This invention relates to polyethylene waxes emulsifiable to fine particle size, stable emulsions. More particularly, the invention relates to modified polyethylene waxes which are readily emulsifiable in aqueous media to fine particle size, stable emulsions and fine particle size stable polyethylene wax emulsions prepared therefrom.

Heretofore, emulsifiable polyethylene waxes have been prepared by incorporation of polar compounds, especially maleic anhydride, by an addition reaction to low molecular weight polyethylenes. Waxes thus produced have highly desirable hardness and melting point characteristics which make many of them useful as substitutes for the harder natural waxes such as carnauba wax.

The reaction of maleic anhydride with polyethylene wax is apparently narrowly critical, with similar conditions producing emulsions of varying quality. As suggested by an increase in viscosity of the wax after reaction with maleic anhydride, some of the molecules are made larger, either by copolymerization or by oxidative crosslinking. When the waxes are emulsified, there is a tendency toward instability and breaking of the emulsion or "creaming." This tendency is greater, of course, if the larger molecules have not been modified.

It is an object, therefore, of the present invention to provide modified polyethylene waxes emulsifiable to fine particle size and, hence, stable emulsions.

It is another object to provide a method for obtaining fine particle size, stable polyethylene wax emulsions.

These and other objects of the invention are accomplished by contacting a polyethylene wax having 0.5 to 3.0% terminal vinyl groups by weight and a molecular weight of from 1000 to about 5000 with thioglycolic acid with agitation at temperatures above about 25° C. to form a thioglycolic acid-polyethylene wax adduct. Thereafter, the adduct is emulsified in the conventional manner for preparing polyethylene wax emulsions.

Finer particle size and more stable emulsions are obtained from the thioglycolic acid modified polyethylene waxes of this invention than are obtained with the heretofore known maleic anhydride modified polyethylene waxes. The property of thioglycolic acid giving consistently more stable and finer particle sized emulsions has not been recognized heretofore.

Thioglycolic acid, $HSCH_2COOH$, is a colorless liquid having a typical mercaptan odor. It is commercially available.

Polyethylene waxes useful in the present invention are ethylene polymers having molecular weight of about 1000 to 5000, preferably 1500 to 5000, and from about 0.5% to 3.0% terminal vinyl groups by weight. These waxy polymers can be prepared by the pyrolysis or thermal degradation of higher molecular weight ethylene polymers. Linear, high density polyethylenes, e.g., 0.95 density and above, when pyrolyzed and reacted with thioglycolic acid in accordance with this invention and then emulsified provide hard, highly polishable waxes and are preferred for this reason. The present invention is not limited, however, to modification of high density polyethylene waxes. Polyethylene waxes having lower densities, e.g., down to above 0.92, can also be modified with thioglycolic acid by the present method and thereafter formed into fine particle size stable emulsions. These latter, lower density polyethylene waxes are useful where surface protection is the paramount consideration and very high polishability is not a requirement.

The polyethylene waxes are suitably obtained for reaction with thioglycolic acid by pyrolyzing substantially linear, high density ethylene homopolymer. The pyrolysis is conveneintly carried out in a heated pyrolysis tube at about 450 to 600° C.

In a preferred method of preparing the thioglycolic acid modified polyethylene waxes of this invention, a polyethylene wax having a density about 0.95 and a molecular weight of from about 1500 to 5000 is blended in the liquid phase, i.e., in the melt or in solution with thioglycolic acid and reacted by being agitated therewith at temperatures of from about 25° C. to about 170° C. The blending and agitation can be carried out in any manner which insures intimate commingling of the reactants and good heat transfer throughout the reaction mass during the reaction time. For example, the polyethylene wax can be dissolved in an inert liquid organic solvent for the wax and acid such as toluene, xylene, cyclohexane, methylcyclohexane, iso-octane and chlorinated hydrocarbon solvents such as ortho-dichlorobenzene, 1,1,2-trichloroethane and α-chloronaphthalene and the thioglycolic acid added with agitation. The dissolving of the polyethylene is most conveniently accomplished at temperatures above 80° or 110° C. for lower density and higher density polyethylene respectively and in aromatic solvents.

Preferably the reaction is carried out in the melt by heating the polyethylene wax to its melting point (ca. 120° C.) and above, e.g., to 155° C., and stirring in the thioglycolic acid in the absence of an organic solvent. Temperatures of reaction above about 170° C. confer no added benefit in speed of reaction or quality of modified wax obtained and, hence, will not be ordinarily used. The viscosity of the melted polyethylene waxes, e.g., 250–1000 centipoises at 140° C. is such that rapid stirring in of thioglycolic acid is easily accomplished. The exact manner or order of addition of the reactants is not critical.

Generally an excess over the amount of thioglycolic acid theoretically necessary to react with the terminal vinyl groups present in the polyethylene wax molecules should be used in order to achieve good rates of reaction. Amounts of thioglycolic acid several times the theoretical amount, e.g., four times the theoretical amount have been found to give progressively more rapid reaction rates, i.e., higher conversions of terminal vinyl groups per unit time. Maximum conversion or highest reaction rate are not necessarily the sole factors to be considered, however, in determining the optimum amount of thioglycolic acid to be used. For example, it is only required for the polyethylene wax to be emulsifiable that about 25% or above of the terminal vinyl groups be converted. Hence, use of more thioglycolic acid than is necessary to make the wax emulsifiable is unnecessary except to reduce the time needed to bring the wax to emulsifiability. There can be employed in the present invention from 1 to 10 times the theoretical amount necessary to convert all the terminal vinyl groups. To achieve rapid rates of reaction from the start it is preferred in the present invention to use 2 to 4 times the theoretical amount of thioglycolic acid.

The following examples illustrate the invention. All parts and percentages are by weight unless otherwise stated.

EXAMPLE 1

A wax was prepared from a linear, high density polyethylene having a melt index of about 1.0 by extruding the resin through a 1¼ inch extruder in series with a 1 inch diameter pyrolysis tube, 12 inches in length. A 12" x 15/16" torpedo was mounted in the pyrolysis tube to form a 1/32" annular clearance at the wall of the tube. A resistance heater was mounted on the outside of the tube wall. Molten polyethylene was extruded at a rate of about 6 pounds per hour past the torpedo, heated to 475° C. and then passed through a water-cooled, ½" diameter tube before emerging into the atmosphere. The degraded polymer had a molecular weight of about 2700–3000 and a vinyl content varying from 0.9 to 1.05% by weight as determined by infrared analysis versus a known sample using the 11.0µ vinyl absorption.

A 500 gram (4.5 grams or .167 mole, or 0.9 percent —CH=CH$_2$) portion of the polyethylene wax was melted at 145° in a 1 liter glass vessel equipped with a chain stirrer and a thermocouple. To the melt was added 36 grams (.39 mole or 230% of the theoretical) of the thioglycolic acid. The mixture was kept at 145°; a sample was removed after 0.5 hour and the remainder cooled after 1.5 hours to give an off-white product essentially the same color as the original wax. The Brookfield viscosity was 400 cps. at 140° C. Penetration (by ASTM D-1321–57T using 200 gram load on the wax) was 1.5 mm. x 10 comparing very favorably with carnauba penetration values of 2–3 mm. x 10.

To determine the extent of the addition reaction, portions of the adduct after 0.5 hour (A) and 1.5 hours (B) were analyzed directly by infra-red. Another portion of the latter adduct (C) was dissolved in xylene, precipitated in acetone to remove unreacted thioglycolic acid and analyzed by infra-red for both percent vinyl and percent —COOH. Results were:

TABLE I

| Reaction time (hrs.) | Percent terminal vinyl | Percent COOH | Fraction terminal vinyl reacted, percent |
|---|---|---|---|
| Unmodified wax | 0.9 | None | |
| (A) 0.5 | 0.56 | | 38 |
| (B) 1.5 | 0.40 | | 56 |
| (C) 1.5 | 0.32 | 0.6 | 64 |

The above polyethylene wax-thioglycolic acid adduct is emulsified by blending 20 parts oleic acid with 100 parts molten adduct. After cooling the mixture to 130° C., 20 parts of morpholine is stirred in. Maintaining the mixture still molten, 800 parts of water are blended in. The resulting slurry is charged to a Parr stirred autoclave and heated to about 150° C. with rapid agitation. The vessel and contents are then cooled to below 100° C. and discharged. A stable, fine particle size emulsion having a milky, translucent appearance is obtained.

EXAMPLE 2

*Control*

A polyethylene wax-maleic anhydride adduct was prepared by heating another portion of the polyethylene wax of Example 1 with about 10% maleic anhydride in a round bottom reaction vessel equipped with a hot water condenser and a stirrer at 200° C. for 60–90 minutes, cooling to 180° C. and stripping off the unreacted maleic anhydride under vacuum.

This adduct, which had a COOH content of 0.9% (calculated as succinic) was emulsified according to the procedure of Example 1 using 100 parts adduct, 20 parts oleic acid, 20 parts morpholine and 800 parts water but was not nearly as stable and had an opaque white appearance as well.

*Example*

An adduct of this invention was prepared in the manner of Example 1 but using 400% of the theoretical amount of thioglycolic acid and reacting for 1.5 hours at 120–130° C. Terminal vinyl group content of the adduct was 0.26%. Seventy-five-hundredths percent of the terminal vinyl groups in the wax were reacted. The COOH content was 0.76%. This adduct was emulsified in the same manner as above using 100 parts adduct, 30 parts oleic acid, 30 parts morpholine, and 800 parts water.

EXAMPLES 3–49

There follows, in tabular form, summaries of Examples 3–49. These examples were carried out in the manner of Example 1 except for amounts of thioglycolic acid used, variations in time and temperature of reaction and, in several of the examples, use of a catalyst and/or a solution reaction. These examples illustrate the wide variety of reaction conditions useful for forming the thioglycolic acid modified polyethylene waxes of this invention. The adducts prepared below can be emulsified by the conventional emulsion techniques known to the art.

Typically the emulsions are prepared by melting the polyethylene wax adduct, and a fatty acid such as, for example, formic, acetic, propionic, butyric, valeric, caproic, enanthylic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isocrotonic, vinylacetic, methylacrylic, tiglic, angelic, senecioic, hexenic, teracrylic, hypogeic, oleic, elaidic, erucic, brassidic, propiolic, propynoic, tetrolic, 2-butynoic, pentinoic, 2-pentinoic, amylpropiolic, palmitotic, stearolic, behenolic, sorbic, linoleic and linolinic acids. These acids have the general formula $$C_nH_{2n+(x)}COOH$$

wherein $n$ is an integer from 0 to 32 and $x$ is an odd number from —5 to +1 with the proviso that when $n=0$, $x=+1$. An amine is then added such as mono- and triethanolamine, monoisopropanolamine, diisopropanolamine, triisopropanolamine, morpholine, N,N-dimethylethanolamine and N,N-diethylethanolamine. The mixture is stirred until thoroughly mixed or until it becomes clear. Water which has been heated to just below the boiling point is added with additional stirring. The mixture is then vigorously agitated in a suitable device, e.g., a bladed mixer, colloid mill or other shear producing apparatus to form the emulsion. Stable emulsions are obtained which generally vary less than 1% in solids content after standing in a separatory funnel for one week. A wax adduct solids content of from 5 to 50% is preferred in these emulsions.

TABLE II

[Examples 3-49]

| Example | Description | Thioglycolic acid, percent of theoretical | Reaction temp., °C. | Catalyst | Reaction time, hrs. | Infrared analysis | | Titration, percent COOH |
|---|---|---|---|---|---|---|---|---|
| | | | | | | Percent terminal vinyl in wax | Fraction terminal vinyl reacted, percent | Percent COOH |
| 3 | Solution (toluene). | 400 | 100 | Piperdine | 4.5 | 0.65 | 37 | 0.2 | 0.28 |
| 4 | Melt | 400 | 122 | None | 1 | 0.29 | 72 | | 0.58 |
| 5[1] | do | 200 | 122 | do | 0.17 | 0.53 | 50 | | |
| 6 | do | 200 | 122 | do | 0.5 | 0.48 | 54 | | |
| 7 | do | 200 | 122 | do | 1 | 0.41 | 61 | | |
| 8 | do | 400 | 120-130 | do | 1.5 | 0.26 | 75 | 0.76 | |
| 9 | do | 105 | 130 | do | 1 | 0.59 | 44 | | |
| 10 | do | 200 | 130 | do | 0.17 | 0.56 | 47 | | |
| 11 | do | 200 | 130 | do | 0.5 | 0.51 | 51 | | |
| 12 | do | 200 | 130 | do | 1 | 0.37 | 65 | | |
| 13 | do | 200 | 130 | Dicumyl-peroxide. | 0.17 | 0.50 | 52 | | |
| 14 | do | 200 | 130 | do | 0.5 | 0.52 | 50 | | |
| 15[1] | do | 200 | 130 | None[2] | 1 | 0.59 | 44 | | |
| 16 | do | 200 | 130 | do | 1 | 0.54 | 49 | | |
| 17 | do | 200 | 130 | do | 3 | 0.56 | 47 | | |
| 18 | do | 200 | 130 | do | 4 | 0.46 | 56 | 0.55 | 0.52 |
| 19 | do | 180 | 140 | do[3] | 1 | 0.56 | 47 | | |
| 20[1] | do | 200 | 145 | do | 0.17 | 0.53-0.56 | 47 | 0.44 | |
| 21 | do | 200 | 145 | do | 0.5 | 0.40 | 62 | | |
| 22[4] | do | 200 | 145 | do | 1 | 0.46 | | | |
| 23 | do | 200 | 145 | Dicumyl-peroxide. | 0.17 | 0.35-0.25 | 76 | 0.53 | |
| 24 | do | 200 | 145 | do | 0.5 | 0.36 | 66 | | |
| 25 | do | 200 | 145 | do | 1 | 0.41 | 61 | | |
| 26 | do | 130 | 145 | do | 0.5 | 0.54 | 40 | | |
| 27 | do | 130 | 145 | None | 1 | 0.51 | 43 | | |
| 28 | do | 130 | 145 | do | 3 | 0.35 | 56 | 0.52 | |
| 29 | do | 152 | 145 | do | 0.5 | 0.45 | 50 | | |
| 30 | do | 152 | 145 | do | 1 | 0.40 | 56 | | |
| 31 | do | 152 | 145 | do | 3 | 0.29 | 67 | 0.60 | |
| 32 | do | 182 | 135 | do | 0.5 | 0.41 | 54 | | |
| 33 | do | 182 | 145 | do | 1 | 0.32 | 64 | | |
| 34 | do | 182 | 145 | do | 3 | 0.30 | 67 | 0.78 | |
| 35 | do | 200 | 145 | do | 0.5 | 0.56 | 38 | | |
| 36 | do | 200 | 145 | do | 1.5 | 0.40-0.32 | 64 | 0.60 | |
| 37 | do | 200 | 145 | Dicumyl-peroxide. | 0.17 | 0.47 | 48 | | |
| 38 | do | 200 | 145 | do | 0.5 | 0.38 | 58 | | |
| 39[4] | do | 200 | 145 | None | 1.5 | 0.66 | 27 | 0.46 | |
| 40 | do | 200 | 155 | do | 0.17 | 0.59 | 44 | | |
| 41 | do | 200 | 155 | do | 0.5 | 0.47 | 55 | | |
| 42 | do | 200 | 155 | do | 1 | 0.42 | 60 | | |
| 43 | do | 200 | 155 | Dicumyl-peroxide. | 0.17 | 0.50 | 52 | | |
| 44 | do | 200 | 155 | do | 0.5 | 0.42 | 60 | | |
| 45 | do | 200 | 155 | do | 1 | 0.41 | 61 | | |
| 46 | do | 200 | 145 | do | 0.17 | 0.91 | 13 | | |
| 47 | do | 200 | 145 | do | 0.67 | 0.91 | 13 | | |
| 48 | do | 200 | 145 | do | 1 | 0.99 | 6 | | |
| 49 | do | 200 | 145 | do | 3 | 0.84 | 20 | | |

[1] Formed clear, fluorescent emulsion.*
[2] N$_2$ atmosphere.
[3] O$_2$.
[4] Formed opaque, white emulsion.*
*Wax adducts emulsified at 140° C. with 20 grams each of oleic acid and morpholine per 100 grams of wax.

In the above table: Example 5 illustrates short reaction time, about 10 minutes, and reaction temperatures at the lower end of the preferred range, 122° C. This wax adduct gave a very clear and stable emulsion; Example 8 illustrates the conversion of 75% of the terminal vinyl groups present in the wax. This wax adduct provided a very good and stable emulsion; Example 15 illustrates preparation of the adduct under an inert atmosphere. This wax adduct provided a clear stable emulsion; Example 39 illustrates the preparation of an adduct with a low conversion of terminal vinyl groups. This wax adduct provided clear stable emulsions.

EXAMPLES 50-53

These examples illustrate the effect of a free-radical catalyst (dicumyl peroxide) on the reaction of thioglycolic acid with polyethylene wax containing terminal vinyl unsaturation.

In Examples 50-52, 50 grams of wax were melted and reacted with 200% of the theoretical amount of thioglycolic acid both in the presence and absence of dicumyl peroxide.

Results of these examples are summarized in Table III below.

A large batch of wax of 500 grams of polyethylene was also modified by reaction with 200% of the theoretical amount of thioglycolic acid in Example 53. Results appear in Table III.

TABLE III

[Examples 50-53]

| Example | Temp., °C. | Reaction time, hours | Percent —CH=CH$_2$ reacted | |
|---|---|---|---|---|
| | | | No catalyst | Dicumyl peroxide |
| 50-1 | 130 | 0.17 | 47 | 52 |
| -2 | 130 | 0.5 | 51 | 50 |
| -3 | 130 | 1 | 65 | |
| 51-1 | 145 | 0.17 | 50 | 67 |
| -2 | 145 | 0.5 | 62 | 66 |
| -3 | 145 | 1 | 56 | 61 |
| 52-1 | 155 | 0.17 | 44 | 52 |
| -2 | 155 | 0.5 | 55 | 60 |
| -3 | 155 | 1 | 60 | 61 |
| 53-1 | 145 | 0.17 | | 48 |
| -2 | 145 | 0.5 | 38 | 58 |
| -3 | 145 | 1.5 | 56 | 58 |

It can be seen that the use of a free radical catalyst is particularly advantageous at lower temperatures and shorter reaction times and progressively less important as reaction temperature is raised and the reaction time extended.

The polyethylene wax-thioglycolic acid adducts of this invention are useful in the preparation of wax emulsions which can be used as decorative and protective coatings for a wide variety of surfaces ranging from floor and wall tiles to shoe leathers and car polish.

Other ingredients can be added to the emulsions prepared from the polyethylene wax-thioglycolic acid adducts of this invention. For example, there can be included abrasives, such as bentonite and tripoli, silicone oils such as methyl silicone, mineral spirits, clays and other fillers, colorants, extenders and modifiers.

What is claimed is:

1. Method for preparing modified polyethylene wax emulsifiable to stable, fine particle size emulsions comprising contacting in the liquid phase a polyethylene wax having from 0.5 to 3.0% terminal vinyl groups by weight and a molecular weight of from 1000 to about 5000 with thioglycolic acid at a temperature above about 25° C. until at least 25% of said vinyl groups have reacted with the thioglycolic acid.

2. Method for preparing modified polyethylene wax emulsifiable to stable, fine particle size emulsions comprising contacting in the liquid phase a polyethylene wax having from 0.5 to 3.0% terminal vinyl groups by weight and a molecular weight of from 1000 to about 5000 with thioglycolic acid at a temperature between about 80° C. and 170° C. until at least 25% of said vinyl groups have reacted with the thioglycolic acid.

3. Method claimed in claim 2 wherein the polyethylene wax and thioglycolic acid are dissolved in a mutual solvent.

4. Method for preparing modified polyethylene wax emulsifiable to stable, fine particle size emulsions comprising contacting in the liquid phase a polyethylene wax having from 0.5 to 3.0% terminal vinyl groups by weight, a molecular weight of from 1000 to about 5000 and a density above about 0.95 with thioglycolic acid at a temperature between about 120° C. and 155° C. until at least 25% of said vinyl groups have reacted with the thioglycolic acid.

5. Method claimed in claim 4 wherein the polyethylene wax is melted and blended with the thioglycolic acid in the absence of an organic solvent.

6. Method for preparing stable, fine particle size wax emulsions comprising forming a modified polyethylene wax by reacting together in the liquid phase thioglycolic acid and a polyethylene wax having from 0.5 to 3.0% terminal vinyl groups by weight and a molecular weight of from 1000 to about 5000 at a temperature between about 80° C. and 155° C. until at least 25% of said vinyl groups are reacted and agitating the thus modified wax with emulsifying agents and water.

7. An adduct of thioglycolic acid and a polyethylene wax having from 0.5 to 3.0% terminal vinyl groups by weight, a molecular weight of from 1000 to about 5000 and a density above about 0.92, said adduct having at least 25% of said vinyl groups reacted with thioglycolic acid.

8. An adduct of thioglycolic acid and a polyethylene wax having from 0.5 to 3.0% terminal vinyl groups by weight, a molecular weight of from 1000 to about 5000 and a density above 0.95, said adduct having at least 25% of said vinyl groups reacted with thioglycolic acid.

9. A stable, fine particle size polyethylene wax emulsion comprising water, emulsifying agents and from 5 to 50% by weight of an adduct of thioglycolic acid and a polyethylene wax having from 0.5 to 3.0% terminal vinyl groups by weight, a molecular weight of from 1000 to about 5000 and a density above about 0.92, said adduct having at least 25% of said vinyl groups reacted with thioglycolic acid.

10. A stable, fine particle size polyethylene wax emulsion comprising water, emulsifying agents and from 5 to 50% by weight of an adduct of thioglycolic acid and a polyethylene wax having from 0.5 to 3.0% terminal vinyl groups by weight, a molecular weight of from 1000 to about 5000 and a density above 0.95, said adduct having at least 25% of said vinyl groups reacted with thioglycolic acid.

References Cited in the file of this patent
UNITED STATES PATENTS
2,766,214    Erchak et al. _____ Oct. 9, 1956